US006782410B1

United States Patent
Bhagat et al.

(10) Patent No.: US 6,782,410 B1
(45) Date of Patent: Aug. 24, 2004

(54) METHOD FOR MANAGING USER AND SERVER APPLICATIONS IN A MULTIPROCESSOR COMPUTER SYSTEM

(75) Inventors: Suneel Bhagat, Seattle, WA (US); David A. Risner, Fairborn, OH (US)

(73) Assignee: NCR Corporation, Dayton, OH (US)

(*) Notice: Subject to any disclaimer, the term of this patent is extended or adjusted under 35 U.S.C. 154(b) by 664 days.

(21) Appl. No.: 09/649,768

(22) Filed: Aug. 28, 2000

(51) Int. Cl.[7] .............................. G06F 15/16; G06F 9/46
(52) U.S. Cl. ........................ 709/201; 709/203; 718/105
(58) Field of Search .................................. 709/226, 102, 709/104, 103, 105, 201, 203, 205, 228, 224; 718/105

(56) References Cited

U.S. PATENT DOCUMENTS

| | | | |
|---|---|---|---|
| 5,241,677 A | | 8/1993 | Naganuma et al. |
| 5,317,738 A | | 5/1994 | Cochcroft, Jr. et al. |
| 5,349,656 A | * | 9/1994 | Kaneko et al. ............. 709/102 |
| 5,481,747 A | * | 1/1996 | Kametani ................... 709/102 |
| 5,506,987 A | | 4/1996 | Abramson et al. |
| 5,539,883 A | | 7/1996 | Allon et al. |
| 5,603,029 A | | 2/1997 | Aman et al. |
| 5,675,797 A | | 10/1997 | Chung et al. |
| 5,701,482 A | * | 12/1997 | Harrison et al. ............ 709/105 |
| 5,740,371 A | | 4/1998 | Wallis |
| 5,745,757 A | * | 4/1998 | Lecourtier ................. 709/102 |
| 5,745,778 A | | 4/1998 | Alfieri |
| 5,774,660 A | | 6/1998 | Brendel et al. |
| 5,826,081 A | * | 10/1998 | Zolnowsky ................. 709/103 |
| 5,838,968 A | * | 11/1998 | Culbert ....................... 709/104 |
| 5,872,972 A | * | 2/1999 | Boland et al. .............. 709/102 |
| 5,881,238 A | | 3/1999 | Aman et al. |
| 5,951,694 A | | 9/1999 | Choquier et al. |
| 6,058,423 A | * | 5/2000 | Factor ........................ 709/226 |
| 6,279,028 B1 | * | 8/2001 | Bradshaw et al. .......... 709/201 |
| 6,292,822 B1 | * | 9/2001 | Hardwick ................... 709/105 |
| 6,466,965 B1 | * | 10/2002 | Chessell et al. ............ 709/203 |

* cited by examiner

*Primary Examiner*—John Follansbee
*Assistant Examiner*—Kenny Lin
(74) *Attorney, Agent, or Firm*—James M. Stover

(57) ABSTRACT

The invention groups multiple user and server processes executing in a multi-processor computer into collections such that the processes therein share the same processor affinity. User processes have an instance dedicated to each computer system user, and are organized into a user collection and within the collection are user sessions associated with a particular user. All of the processes in a user session share the same processor affinity. Server processes typically run as a single instance to support all users, and are organized into server collections. New collections and sessions are dynamically created responsive to the creation of new processes whenever it is determined the new processes should not be assigned to existing collections or sessions. As such, the allocation of processors to a collection or user session may occur dynamically in response to process creation or deletion, thereby enabling processor allocation to take into account current computer usage patterns.

11 Claims, 9 Drawing Sheets

METHOD FOR MANAGING USER AND SERVER APPLICATIONS IN A MULTIPROCESSOR COMPUTER SYSTEM

CROSS-REFERENCE TO RELATED APPLICATIONS

This application is related to U.S. patent application Ser. No. 09/649,681, filed on even date herewith by Suneel Bhagat and David Risner and entitled "COLLECTION-BASED DYNAMIC PROCESSOR ALLOCATION IN MULTI-PROCESSOR COMPUTER," the disclosure of which is incorporated by reference herein.

FIELD OF THE INVENTION

The present invention relates to process affinity and workload balancing routines employed within multi-processor computer systems.

BACKGROUND OF THE INVENTION

Multi-user computers, e.g., servers, mainframes, midrange computers, and the like, are typically designed to be shared by many individuals in various ways to execute one or more tasks. Furthermore, even some single-user computers may require the performance of multiple concurrent tasks. In order to improve system performance, a number of computers, and in particular many multi-user computers, are designed to incorporate multiple central processing units (CPUs), or processors to share the overall workloads of such computers.

In many environments, the CPUs operate substantially independent from one another. Nonetheless, even in such environments, some degree of synchronization and communication between CPU's is usually required. Synchronization activities, however, require at least some system overhead, and thus can lower the amount of system resources that are available for performing useful tasks in a computer. Therefore, a great deal of effort has been directed toward minimizing the amount of synchronization required between multiple CPUs in a multi-processor computer.

One type of synchronization required in many multi-processor computers involves maintaining coherence between local caches that are dedicated to various CPUs in a multi-processor computer. In particular, in many multi-processor computers, all of the CPUs share a common memory. However, for performance concerns, each CPU maintains a local cache of most-frequently-accessed memory locations that it can access much more quickly than the main computer memory bank. However, the process of keeping the data in the cache of each CPU coherent, that is, consistent with the data in the cache memories of all of the other CPUs in the computer, can significantly reduce the efficiency of the computer.

One mechanism for improving the performance of multi-processor computer systems available in a number of conventional multi-tasking operating systems is "process affinity". That is, particular processes can be coerced ("hard" affinity) or given a suggestion ("soft" affinity) to run on a particular CPU or set of CPUs in a given computer controlled by the operating system. Doing so minimizes the activity required to maintain cache coherence since it ensures that each process runs on the same CPU all of the time, so the data required by a given process typically does not need to be moved from the cache of one CPU to another.

Several methods for applying process affinity are known. Static process affinity methods assign to each individual process at some point in its lifetime a permanent affinity to a CPU. However, it has been found that it is difficult to maintain a balanced use of all of the CPU's in a computer using static process allocation, since processes come and go, and the CPU requirements for such processes often change over time.

Application-specific process affinity methods permit an application that creates one or more processes to set the affinity of each of its processes as it sees fit. Such methods, however, have only limited utility unless the application is not required to share computer resources with any other application, since typically an application is not permitted to access other applications to determine the utilization of system resources by other applications in a computer. Application-specific process affinity therefore is typically required to assume that a particular application is the only application currently active on a computer.

Static system partitioning process affinity methods are employed in multi-processor computer systems shared by many applications. Each application is given affinity to a fixed subset of CPUs within the computer, typically using a manually-operated software tool. The specific set of CPUs assigned to each application is typically determined by the average CPU resource need of the application, at least as of the particular point in time at which the tool is used. However, given that the allocation is static in nature, this mechanism tends to produce non-optimal results if the group of applications being run does not exhibit a consistent CPU usage pattern over time. Therefore, if usage patterns vary from those assumed as of the time the tool was last used, application requirements may change and cause unbalanced loads across the available processors.

Static user process affinity methods are employed in multi-processor computer systems shared by many users. This process affinity method assigns all processes created by a given user the same affinity. As with static system partitioning methods, allocations established through static user affinity methods are static in nature making it difficult to maintain a balanced use of all of the CPUs in the system as the group of users and their processes change over time.

Another method for applying process affinity, referred to as static system partitioning with static user management, finds application in multi-processor computer systems shared by many applications and by many users. Utilizing this method of process affinity, each application is given affinity to a fixed subset of CPUs within the computer system, while all users share the remaining CPUs. Additionally, all processes created by a given user are given the same affinity. This method, combining both static system partitioning and static user affinity mechanisms, has the shortcomings associated with both of those mechanisms.

In each of the aforementioned instances, CPU or processor allocation is static in nature, and does not take into account variations in usage patterns. Assumptions about usage patterns made when resources are allocated often may not be valid at later points in time. Therefore, a significant need exists in the art for a manner of establishing and then maintaining efficient utilization of CPUs in a multi-processor computer in spite of inconsistent CPU usage patterns that vary over time.

SUMMARY OF THE INVENTION

The invention addresses the above described and other problems associated with the prior art by providing an apparatus, computer-readable medium and method that group multiple user and server processes executing in a multi-processor computer into "collections" such that all of the processes in a given collection share the same processor affinity, and thus are assigned to a common set of processors available in the multi-processor computer. User processes, i.e., processes associated with application programs such as word processors or mail readers that have an instance dedicated to each computer system user, are organized into a user collection. Server processes, i.e., processes associated with application programs such as databases and electronic mail post offices that typically run as a single instance to support all users, are organized into one or more server collections.

User processes are further grouped within the user collection into one or more user sessions, each session includes one or more processes associated with a particular user. All of the processes in a given user session share the same processor affinity, and thus are assigned to a common subset of processors within the set of processors assigned to the user collection.

Moreover, new server collections and user sessions are dynamically created responsive to the creation of new processes in such a computer whenever it is determined that such new processes should not be assigned to any existing collections or sessions resident in the computer. As such, the allocation of processors to a server collection or user session may occur dynamically in response to process creation, thereby enabling processor allocation to take into account current computer usage patterns. Dynamic processor allocation in this manner consequently has the capability of more efficiently allocating resources than would otherwise be possible using conventional static allocation strategies in instances where resource usage patterns are inconsistent and/or variable over time.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION OF THE PREFERRED EMBODIMENT

Figure 1:
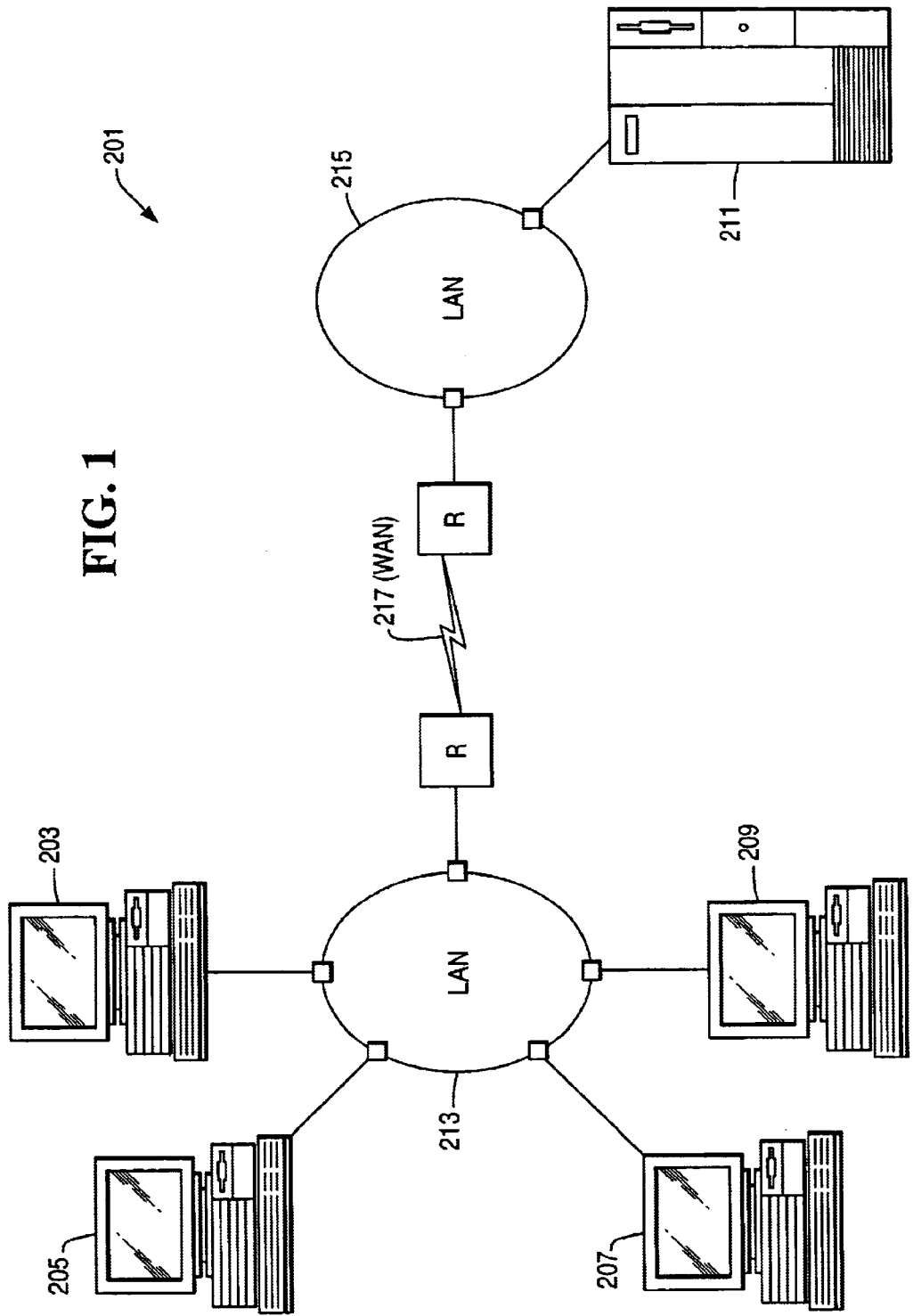
FIG. 1 is a simplified block diagram of a multi-user computer system.

Referring now to FIG. 1, a representative multi-user computer system 201 having multiple client computers 203, 205, 207, and 209, and a system server computer 211 is shown. Each of the client computers 203, 205, 207, and 209 is connected to a first local area network (LAN) 213. Similarly, server 211 together with other server or client computers (not shown) is connected to a second local area network 215. The two LANs 213 and 215 are located in geographically disperse locations and connected together through a wide area network (WAN).

Client computers 203, 205, 207 and 209 may be personal computers, workstations, "thin-client" computer terminals, "X" terminals or other computer terminals. Server 211 is a multiprocessor computer server, such as NCR Corporation's 4800 computer server including up to four processors. In the multi-user system shown, application processes initiated at the user or client computers are executed on processors within server 211. Only display updates are transferred over the WAN from the server to the client computers.

The system 201, unless preventive measures are taken, will be prone to random process migration; wherein processes will be randomly distributed among the system processors for execution. This migration leads to inefficient use of system resources, particularly cache memory within the system. The throughput of the server, as well as the latency of the individual jobs, can best be achieved by assigning each individual job or process "affinity" to a given processor, so that all of the instructions and data associated with the individual job can remain readily accessible in a local cache memory.

Figure 2:
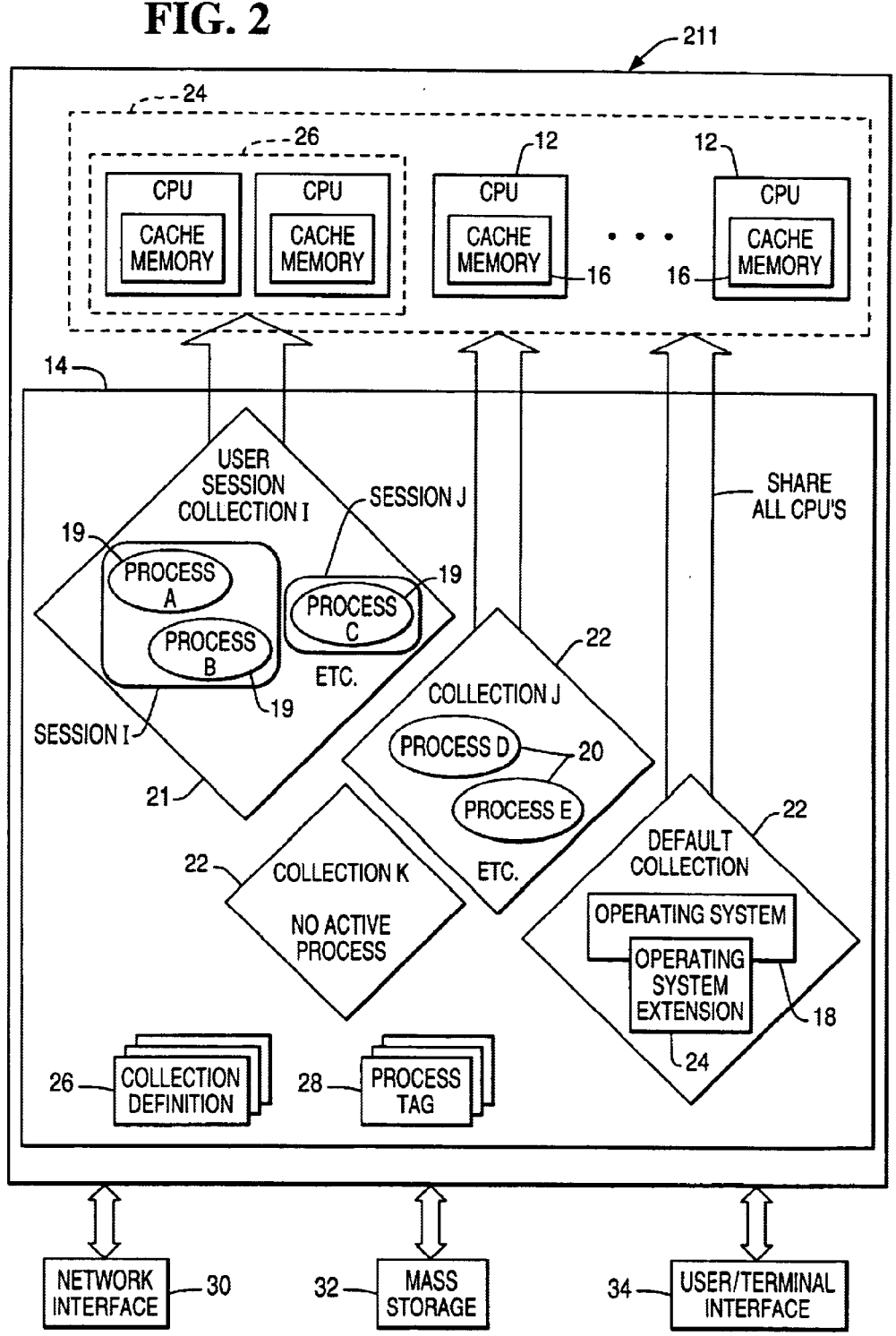
FIG. 2 is a block diagram of a multi-processor computer consistent with the invention.

Multiprocessor server computer 211, implementing dynamic process allocation consistent with the invention, is illustrated in FIG. 2. Although the embodiment of the invention described herein is implemented within a multi-processor server within a local area network, those skilled in the art will recognize that the invention has application to practically any type of computer, computer system or other programmable electronic device capable of utilizing multiple processors, including a client or other single-user computer (e.g., a desktop computer, a laptop computer, a handheld computer, etc.), a server or other multi-user computer (e.g., an enterprise server, a midrange computer, a mainframe computer, etc.), an embedded controller, etc. Server computer 211 may be coupled to other computers via a network, or may be a stand-alone device in the alternative. Server computer 211 may be implemented, for example, as an Intel-based Symmetric Multi-Processing (SMP) server running the Windows NT 4.0 Terminal Server Edition software available from Microsoft Corporation, among other possible hardware/software environments.

Server computer 211 includes a plurality of central processing units (CPU's), or processors, 12 coupled to a main memory 14. In the illustrated embodiment, main memory 14 is a uniform access shared memory, whereby each CPU 12 sees the same image of the shared memory and has equal access to the shared memory as any other CPU. In other embodiments, however, other memory architectures may be used, e.g., non-uniform memory access (NUMA) memory architectures, heterogeneous multiprocessing architectures, distributed shared memory architectures, etc.

Memory 14 typically represents the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, as well as any storage capacity used as a virtual memory, e.g., as stored on a mass storage device or on another computer coupled to computer 10 via a network.

As a specific component of the memory architecture of computer 211, each CPU 12 includes one or more levels of dedicated cache memory, illustrated at 16. Each cache memory 16 may include, for example, L1, L2 and/or L3 caches, as well as separate data and instruction caches or integrated caches that store both program instructions and data. It should be appreciated, however, that additional cache memories may also be disposed within computer 211, e.g., one or more levels of cache memories shared by multiple CPU's 12 (not shown). Furthermore, any number of memory architectures may be used to implement shared memory 14 consistent with the invention.

Computer 211 also typically receives a number of inputs and outputs for communicating information externally. For example, connection to one or more networks (e.g., a LAN, a WAN, a wireless network, and/or the Internet, among others) may be implemented via a network interface 30. External and/or persistent storage via one or more mass storage devices 32 (e.g., a floppy or other removable disk drive, a hard disk drive, a direct access storage device (DASD), an optical drive, and/or a tape drive, among others) may also be implemented. Furthermore, for interface with one or more users or operators, computer 211 may include one or more user input devices (e.g., a keyboard, a mouse, a trackball, a joystick, a touchpad, and/or a microphone, among others) and display devices (e.g., a CRT monitor, an LCD display panel, and/or a speaker, among others) and/or an interface to one or more client computers such as terminals, workstations, etc. Support for such user interface is provided, for example, via one or more user/terminal interfaces represented at 34.

Computer 211 operates under the control of an operating system 18, and executes or otherwise relies upon various computer software applications, components, programs, objects, modules, data structures, etc. For example, a plurality of active processes 19, 20 (also denoted as processes a–e) are illustrated in FIG. 2. It should also be appreciated that operating system 18 may be comprised of multiple processes (not separately shown in FIG. 2).

It is essential to note at this time that there is an important distinction between applications or processes shared by all users and applications or processes owned by a single user. The former set of applications, referred to as server applications, is made up of programs such as databases and electronic mail post offices that typically run as a single instance to support all users. The latter set of applications, referred to as user applications, is made up of programs such as word processors or mail readers that have an instance dedicated to each user. As a result, a single instance of a user application is not shared between users, even if those each of the users is running the same program.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of existing in a computer-readable medium, which may include recordable media such as volatile/non-volatile memory devices, floppy and other removable disks, hard disk drives, magnetic tape, optical disks, etc., and/or transmission media such as digital and analog communication links. Furthermore, embodiments of the invention may also exist in the form of a signal borne on a carrier wave, either within a computer or external therefrom along a communications path.

Those skilled in the art will recognize that the exemplary environment illustrated in FIG. 2 is not intended to limit the invention. Indeed, those skilled in the art will recognize that other alternative hardware and/or software environments may be used without departing from the scope of the invention.

Dynamic process allocation in the illustrated embodiment is implemented in part by defining a user collection 21, and one or more server collections 22, each of which is capable of being assigned one or more processes 19, 20 for the purpose to allocating a subset of CPU's 12 in computer 211 to handle all of the processes assigned to such a collection. Overall management of such functionality is implemented in the illustrated embodiment in the form of an operating system extension 24, also referred to herein as a driver, used to enhance the multi-processing performance of the computer in a manner consistent with the invention. However, it should be appreciated that the operating system may simply be modified to support the herein-described functionality, or that such functionality may be implemented in other software components consistent with the invention.

One advantage of the use of a user collection and one or more server collections is that computer resources may be efficiently partitioned to ensure suitable CPU availability for both user and non-user processes, and without detriment to either type of process.

Typically, server processes 20 are organized into collections 22 based upon some characteristic common to all of the processes. As an example, it may be desirable to collect processes that generally rely on similar data and constrain those processes to operate on a subset of processors in the computer to minimize migration of processes to various CPU's, and thereby maximize cache efficiency in the local caches of the CPU's. Examples of suitable characteristics upon which to build collections include, for example, an application collection that groups together application processes of a given type, a resource collection that groups together processes that rely on common system resources, a collection that groups together processes that generally do not operate concurrently with one another, etc.

Consistent with the invention, user and server collections are defined in the computer to group together processes in such a manner that all of the processes grouped within a collection share the same CPU affinity—that is, each process in a group is assigned to a common set of CPU's from those available in the computer. FIG. 2, for example, illustrates a plurality of collections 22, 23 also designated herein as collections i, j and k and a default collection within which is resident operating system 18. Collection i is illustrated as incorporating three user processes a, b and c, and having affinity to a first set of CPU's designated at 26. Collection j is illustrated as incorporating two server processes d and e, and having affinity to a second set of CPU's, here a single CPU 12. The default collection, within which the operating system resides, is implemented as a system-wide, shareable collection, whereby the default collection has affinity to all of the CPU's 12 available in computer 10.

Within the user collection i, processes are grouped together into one or more sessions. Each session includes one or more processes associated with a particular user. For example, user collection i is shown as including two user sessions identified as session i and session j. Processes a and b, both associated with a first user, are grouped together into session i. Session j includes a single process, process c, associated with a second user. The user collection may be allocated a variable number of CPU's, with the number of CPU's allocated to the user collection varied over time responsive to the needs of other collections in the computer.

In addition to the grouping of processes into collections, another important aspect of the herein-described processor allocation functionality is that of dynamic allocation. Specifically, collections are dynamically allocated CPU's in the computer upon creation of such collections, and typically in response to creation of a new process. Moreover, whenever a collection is deleted, e.g., in response to destruction of the last process in such a collection, the CPU resources allocated to such a collection are released, such that later collection allocation operations can obtain access to such released resources. As such, in contrast with conventional static allocation algorithms, CPU's can be allocated based upon changing usage patterns in a computer due to the creation and deletion of processes over time. Furthermore, as will become more apparent below, additional rebalancing of CPU resources may be performed in some embodiments to dynamically reallocate CPU's to processes to maximize system performance. Other benefits will be apparent to one of ordinary skill in the art.

As is also shown in FIG. 2, a number of data structures are utilized in connection with dynamic processor allocation consistent with the invention. For example, a plurality of collection definitions 26 are resident in memory 14 for the purpose of describing collections, and in particular, describing groups of processes that should be treated as single units for processor allocation. Each collection definition typically includes a collection identifier, attribute information, CPU allocation information and optional usage threshold information.

The collection identifier uniquely identifies a collection, and may be implemented using any number of known identification schemes.

The attribute information typically includes a plurality of flags, e.g., a system-wide flag, a shareable flag and a dynamic flag. The system-wide flag indicates that a collection should be assigned to all CPU's in the computer, such that all CPU's may handle work on behalf of any process in the collection. The shareable flag indicates whether the CPU's assigned to the collection are permitted to perform operations for processes in other collections in addition to system-wide collections (e.g., the default collection), or whether those CPU's are solely available to processors in the specified collection. The dynamic flag indicates whether the set of CPU's assigned to the collection may be modified while any of the processes in the collection are active. Additional attributes may also be associated with a collection definition consistent with the invention.

In the illustrated embodiment, any collection that is system-wide must also be shareable. Moreover, even if a collection is not system-wide, the default collection, and in particular the operating system process therein, is still permitted to utilize the CPU's assigned to the non-system-wide collection. Other allocation rules may also be used in the alternative.

The CPU allocation information for a collection definition specifies information regarding the CPU requirements for the collection. In one embodiment, for example, the CPU allocation information may specify a desired number of CPU's (a processor count) to be assigned to the collection. Also, the specified number may represent a minimum number that must be assigned, permitting additional CPU's to be assigned if sufficient availability exists. In another embodiment, a minimum and a maximum number of CPU's may be specified.

Moreover, while no specific CPU's may be specified for inclusion or exclusion for a collection, in some embodiments it may also be desirable to specify which of the CPU's in the computer may be assigned to the collection, e.g., using a bit mask that identifies allowable CPU's for a collection. In heterogeneous systems, for example, certain CPU's may not support certain functionality required by a given collection. In such embodiments, selection of CPU's for assignment to a collection would be limited to those CPU's designated as allowable for the collection.

The usage threshold information for a collection definition optionally indicates usage thresholds for a collection that should trigger notification by the timer routine (FIG. 9) when such usage thresholds are exceeded. Any number of known usage metrics may be relied upon consistent with the invention.

Another data structure utilized in performing dynamic processor allocation is a process tag 28, a number of which are shown resident in memory 14 in FIG. 2. Each process tag includes a process identifier that identifies, or "tags", a process requiring special treatment to ensure desired process grouping in the manner discussed herein. The process identifier includes information such as a process name or a globally unique number that may be used to determine whether a created process is associated with a process tag. In addition, each process tag includes a collection identifier that identifies the collection definition for the collection with which a tagged process is to be associated. A session identifier is included to identify the session definition for the session with which a tagged user process is to be associated.

As will become more apparent below, collection definitions and process tags may be created responsive to manual user input, or may be predefined by the operating system extension or driver, and stored persistently for retrieval by the driver upon startup. In other embodiments, such definitions and tags may be created automatically, e.g., in response to system usage analysis. Furthermore, other data structures may be used to store collection and process information, as will be apparent to one of ordinary skill in the art having the benefit of the instant disclosure.

Figure 3:
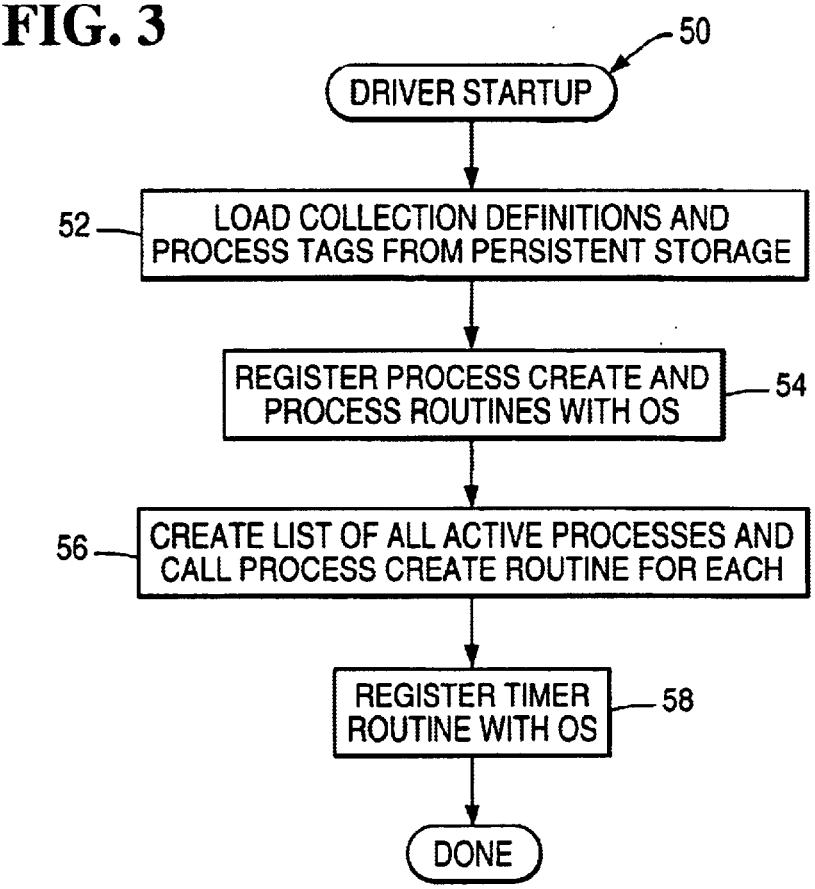
FIG. 3 is a flowchart illustrating the program flow of a driver startup routine executed by the operating system in the computer of FIG. 2.

FIGS. 3 through 11 next illustrate a number of routines for implementing dynamic process allocation consistent with the invention. For example, a driver startup routine 50, used to initialize driver 24, is illustrated in FIG. 3. Driver startup routine 50 begins in block 52 by loading any predefined collection definitions and process tags from persistent storage. Next, block 54 registers a pair of routines, "process create" and "process delete" (discussed in more detail below in connection with FIGS. 5 and 6, respectively), with the operating system for the purpose of receiving notifications of process creation and deletion events in the operating system. In the alternative, a single routine may be used, with a parameter passed from the operating system indicating whether the notification was for a process creation or destruction. By registering such routines, the process create routine will be initiated whenever a new process is requested. Likewise, the process delete routine will be initiated whenever termination of an existing process is requested.

In the illustrated embodiment, for example, a callout interface, e.g., as supported by the Windows NT operating system from Microsoft Corporation, may be used to permit the driver to be notified whenever a new process is created or destroyed. In other operating systems, similar interfaces may be provided, or in the alternative, the operating system itself may be modified to add such functionality. Moreover, as will become more apparent below, the operating system typically is required to support (either in its original or in a modified form) both a mechanism for getting and setting CPU affinity for a particular process, and for identifying and retrieving information about active processes.

Next, block 56 creates a list of all active processes resident in the computer and calls the process create routine (FIG. 5) for each such active process. As will become more apparent below, block 56 principally finds benefit in implementations where driver 24 may be started after computer 10 is operational to initially balance the workload across the CPU's in the computer. In other embodiments, e.g., where routine 50 is only called during initial startup of the computer, block 56 may not be required.

Next, block 58 registers a timer routine (FIG. 9) with the operating system, resulting in initialization of the timer routine to operate as a background task for performing statistical performance information, as well as to dynamically re-balance the workload in some embodiments. In some instances, block 58 may also be omitted. Routine 50 is then complete.

Figure 4:
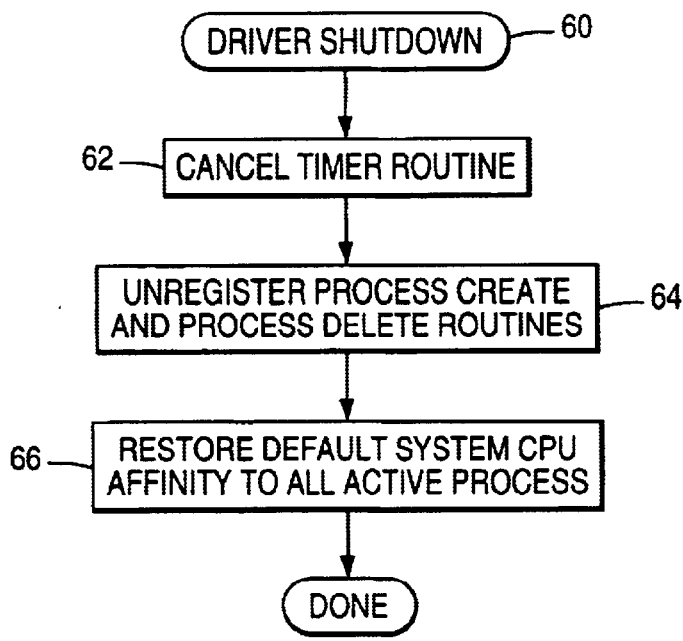
FIG. 4 is a flowchart illustrating the program flow of a driver shutdown routine executed by the operating system in the computer of FIG. 2.

FIG. 4 next illustrates a complementary driver shutdown routine 60 for use in performing shutdown of the driver. Routine 60 begins in block 62 by canceling the timer routine. Next, block 64 un-registers the process create and process delete routines from receiving notifications. Next, block 66 restores the default system CPU affinity to all active processes, essentially permitting all active processes to share system resources in a conventional manner. Routine 60 is then complete.

Figure 5:
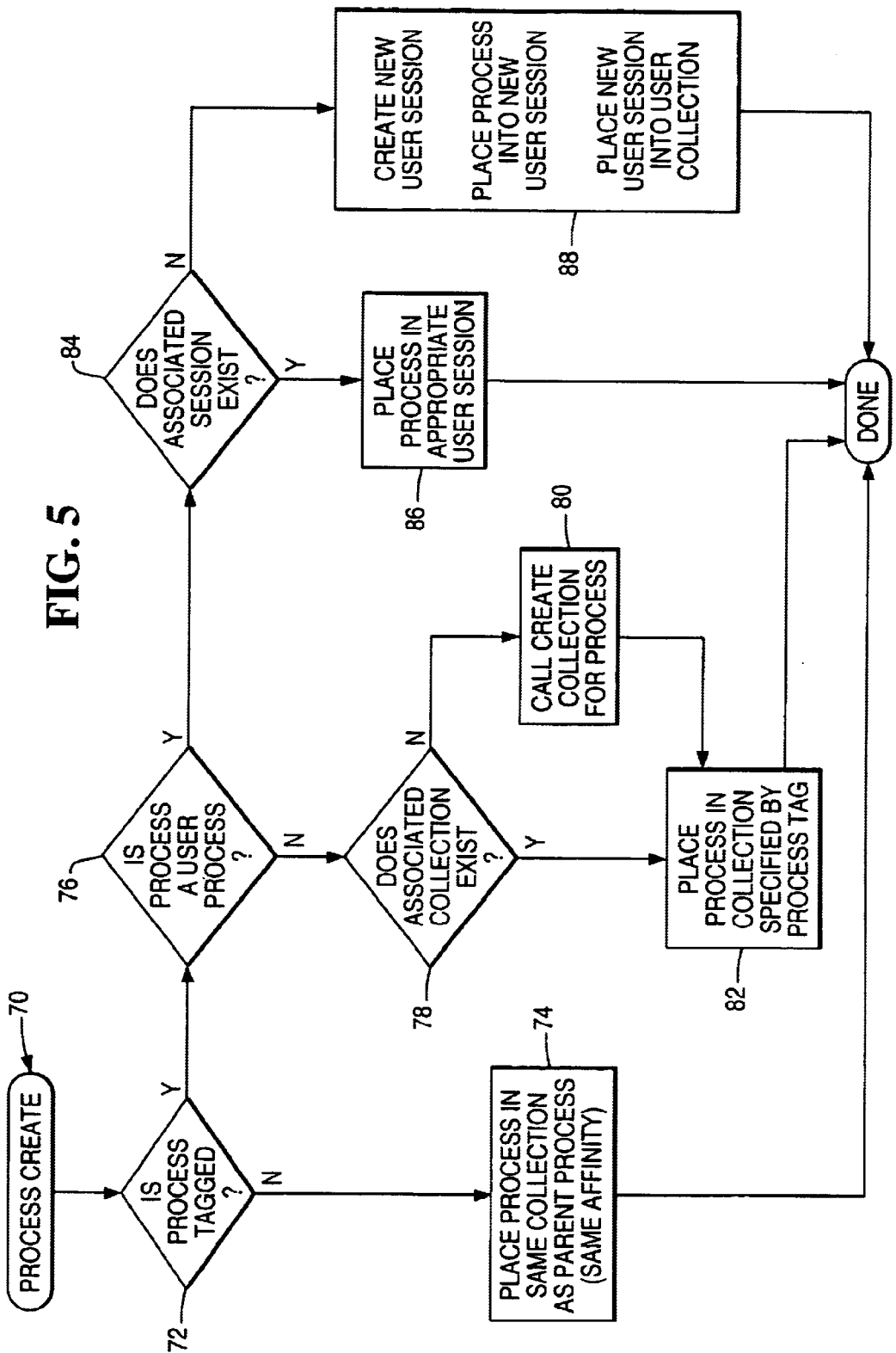
FIG. 5 is a flowchart illustrating the program flow of a process create routine executed by the driver in the computer of FIG. 2.

FIG. 5 next illustrates a process create routine 70 for use in dynamically allocating a process to a collection in response to a request to create a new process. As discussed above, routine 70 is typically called as a result of a request to create a new process, by virtue of the registration of the process create routine to receive notifications of new process creation (see block 54 of FIG. 3). Routine 70 begins in block 72 by determining whether the new process is tagged—that is, whether a process tag can be found that identifies the process as one for which special treatment is desired.

If no process tag is found (indicating no special treatment should be afforded the process), block 72 passes control to block 74 to place the process in the same collection as its parent process, thereby assigning the same processor affinity to the process as its parent. Put another way, the process "inherits" its affinity from its parent process. Typically, this may be implemented by the operating system for efficiency's sake. As discussed above, ultimately all processes are descendants of the operating system process, and as such, absent any intervening process having special allocation to another collection, new processes will typically be grouped into the system-wide and shareable default collection along with the operating system process, such that such new processes will be assigned to all processors. Upon completion of block 74, routine 70 is complete.

Returning to block 72, if a process tag is found (indicating special treatment is desired), control passes to block 76 to identify if the process is a user process. If the process is not a user process, control passes to block 78 to determine whether the associated server collection identified in the process tag exists—that is, whether such a collection has already been created. If not, control passes to block 80 to call a create collection routine (FIG. 7) to create a new collection for the process. Control then passes to block 82 to place the process in the newly-created collection, as specified in the process tag for the process. Returning to block 78, if the associated collection already exists, block 80 is bypassed, and control passes directly to block 82 to place the process in the associated collection. Upon completion of block 82, routine 70 is complete.

Returning to block 76, if the process is determined to be a user process, control passes to block 84 to identify whether the new process can be associated with an existing user session, i.e., whether the process is created for a user for which a user session has already been created. If so, control passes to block 86 to place the process in the associated session within the user collection. Upon completion of block 86, routine 70 is completes. If block 84 determines that the new process has been created from a new user, block 84 passes control to block 88. Block 88 executes routines to create a new user session, places the new process into the new session, and place the new user session into the user collection. Upon completion of block 88, routine 70 is complete.

In the illustrated embodiment, the operating system is configured to maintain information for each process that identifies which of the active CPU's the process is allowed to run. Such information may be stored, for example, using a bit mask (e.g., a CPU or processor affinity mask), with each bit in the mask used to indicate whether a CPU corresponding to such a bit is available for the specified process. As such, whenever a process is placed in a collection, or whenever a process inherits from a parent, a CPU affinity mask that is the same as that associated with the collection, or as that associated with the parent process, is associated with the newly created process as well. Typically, this may be implemented by the operating system.

Figure 6:
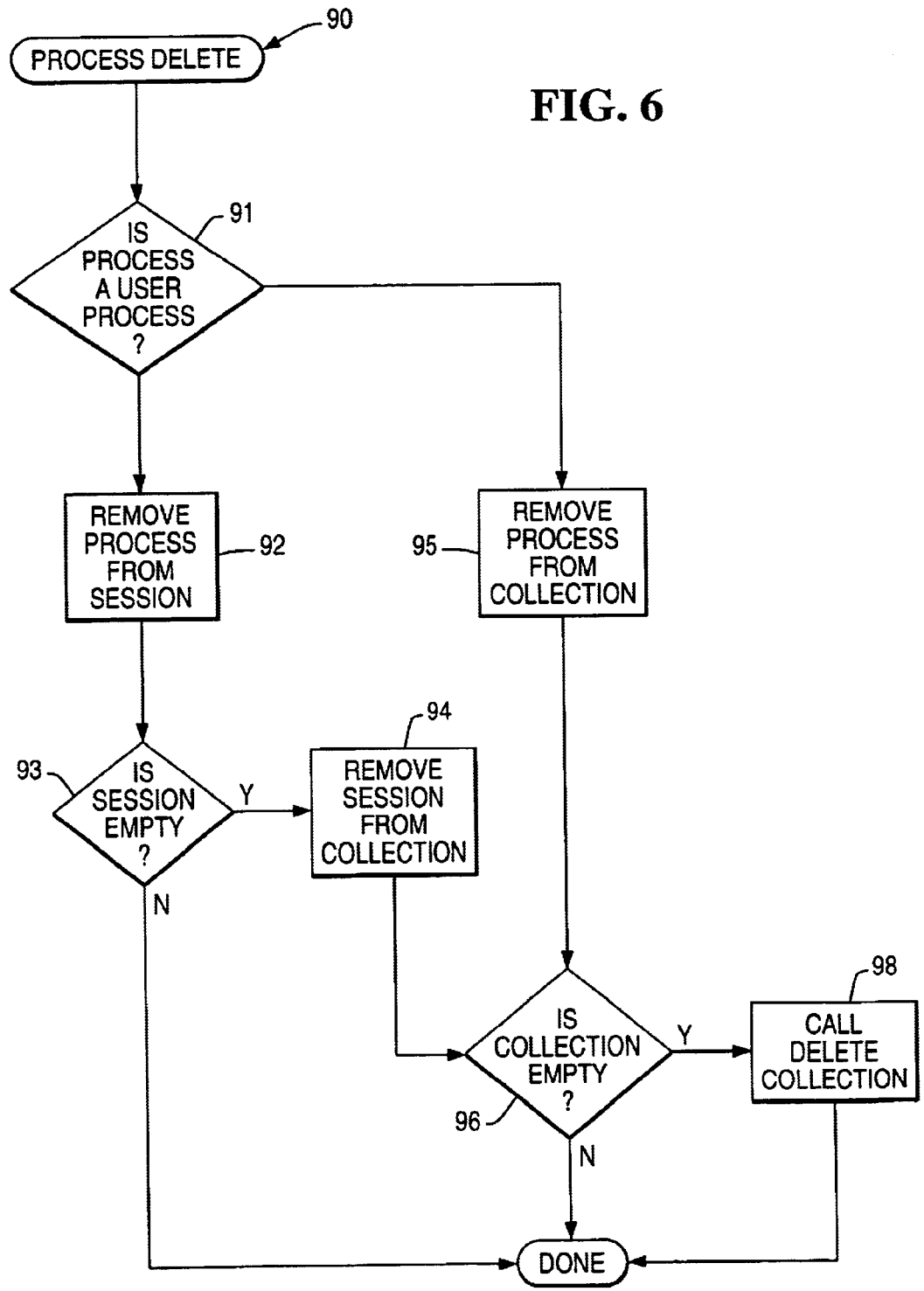
FIG. 6 is a flowchart illustrating the program flow of a process delete routine executed by the driver in the computer of FIG. 2.

FIG. 6 illustrates a process delete routine 90 in greater detail. Routine 90 is called in response to a request to destroy a process, by virtue of the registration of the process delete routine to receive notifications of process destruction (see block 54 of FIG. 3). The process delete routine differs for a user process and a server process. For a user process routine 90 begins in block 92 by removing the process from its associated session. Next, block 93 determines whether the associated session is empty, i.e., whether the process was the last process in the session. If not, routine 90 terminates. If so, control passes instead to block 94 to remove the empty session from the user collection. Control is then passed to block 96 to determine whether the user collection is empty.

Process routine 90 begins in block 95 for a server process by removing the process from its associated collection, and passing control to block 96. Block 96 determines whether the associated collection is empty, i.e., whether the session or process was the last session or process in the collection. If not, routine 90 terminates. If so, control passes instead to block 98 to call a delete collection routine (FIG. 8) to delete the now-empty collection. Routine 90 is then complete.

Figure 7:
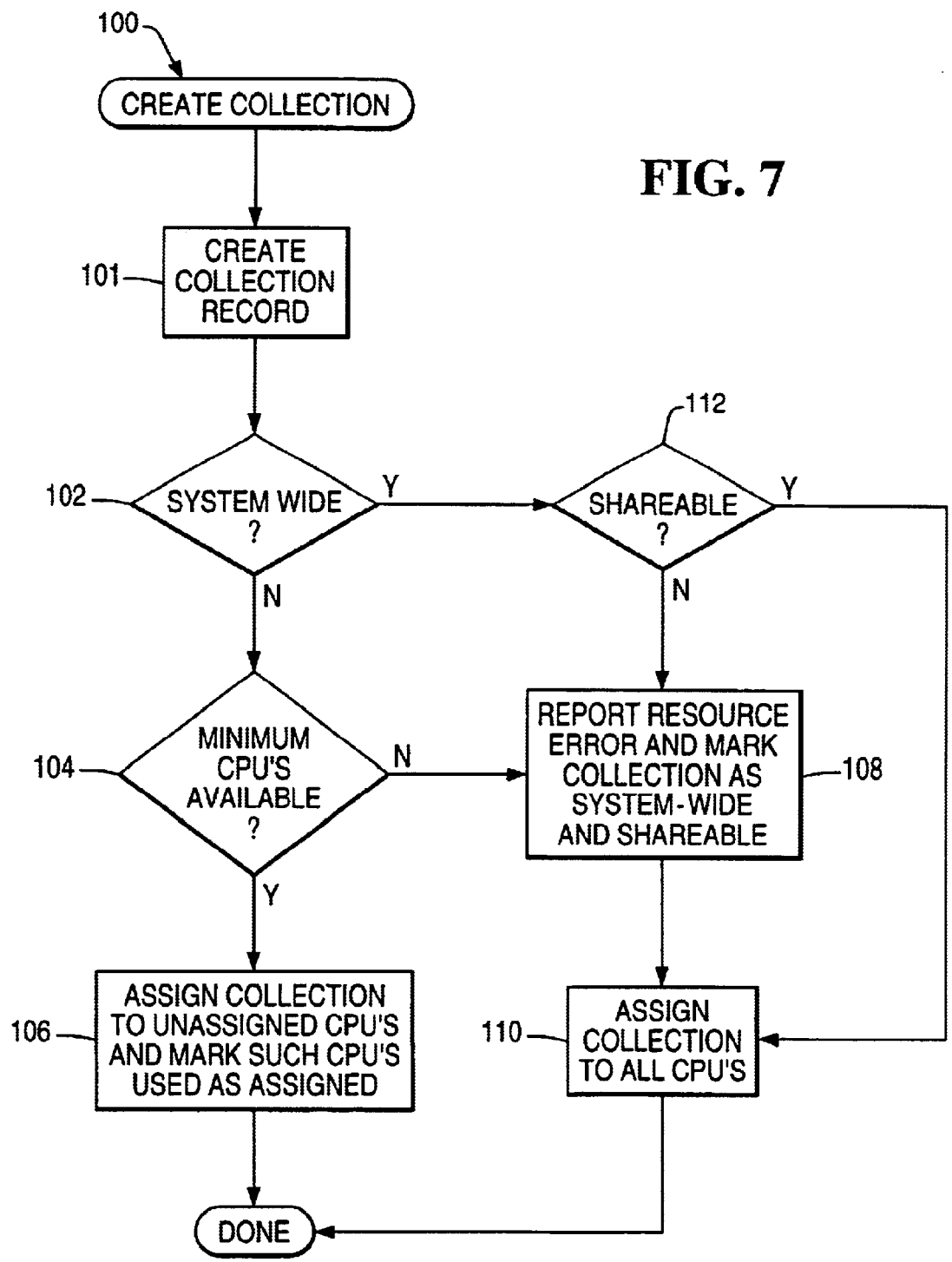
FIG. 7 is a flowchart illustrating the program flow of a create collection routine executed by the driver in the computer of FIG. 2.

FIG. 7 illustrates a create collection routine 100, which is typically called as discussed above in connection with block 78, and possibly block 88, of FIG. 5 to create a new collection for a newly-created process. In some embodiments, it may also be desirable to permit routine 100 (and/or routine 120, discussed below) to be called by a configuration routine that adds or deletes collection definitions while the computer is active. In such embodiments, it may also be desirable to move existing processes associated with an existing collection to a new collection that is being created, as well as to move processes out of a collection being deleted and into another collection.

Routine 100 relies on information stored in a collection definition associated with the collection to be created. Routine 100 begins in block 101 by creating a collection record based upon the information in the collection definition. Next, block 102 determines whether the collection should be system-wide—that is, whether the collection should be granted access to all of the available CPU's in the system. Such a determination is typically made by accessing a system-wide flag in the attributes associated with the collection record created for the collection.

Assuming first that the collection is not system-wide in nature, control passes from block 102 to block 104 to determine whether the minimum number of CPU's specified in the collection record for the collection is available—that is, whether a sufficient number of CPU's are currently unassigned to meet the minimum number of required CPU's for the collection. In addition, if a range or other limitation as to which of the CPU's in the computer may be used for the collection is specified in the collection record, block 104 may also be required to determine whether this requirement is also met.

If so, control passes to block 106 to assign the collection to one or more unassigned CPU's in the computer (e.g., by associating a CPU affinity mask with the collection and storing such a mask in the collection record therefor), and to mark such CPU's as assigned, or unavailable. In embodiments where a range of CPU's is specified, typically the minimum number of CPU's specified is initially assigned for the collection. Routine 100 is then complete.

Returning to block 104, if the minimum CPU's are not available, control passes to block 108 to report a resource error to the operating system and mark the collection as system-wide and shareable (e.g., by updating the collection record). Typically, reporting the resource error results in the creation of an entry in a log file and/or notification of a system administrator. Control then passes to block 110 to assign the collection to all CPU's in the computer (e.g., by storing a system-wide CPU affinity mask in the collection record). In addition, returning to block 102, if the collection is system-wide, control passes to block 112 to also determine whether the collection is also marked as shareable (i.e., whether processes from the collection are allowed to share CPU's with other processors from other collections). If so, control passes to block 110 to assign the collection to all CPU's. Otherwise, control passes to block 108 to report a resource error and modify the collection record to make the collection shareable, as system-wide non-shareable collections are not permitted in the illustrated embodiment. Upon completion of block 110, routine 100 is then complete.

Figure 8:
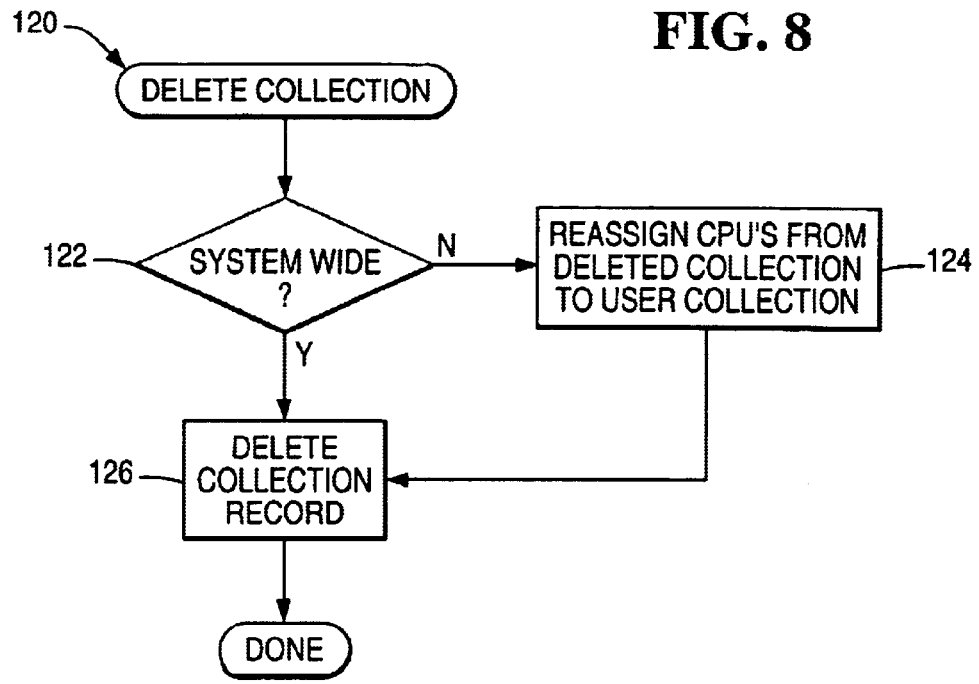
FIG. 8 is a flowchart illustrating the program flow of a delete collection routine executed by the driver in the computer of FIG. 2.

FIG. 8 next illustrates a delete collection routine 120, which is typically called as discussed above in connection with block 98 of FIG. 6 to delete a collection when no more processes exist in the collection. Routine 120 begins in block 122 by determining whether the collection is marked as system-wide. If so, block 122 passes control to block 126 to delete the collection record associated with the collection, and terminate routine 120. On the other hand, if the collection is not system-wide, control passes from block 122 to block 124 to delete the collection by reassigning all CPU's assigned to such collection to the user collection. If the collection being deleted is the user collection, the CPUs assigned to the session are marked as unassigned, or available, thereby freeing up such CPU's for use by other collections. Upon completion of block 124, the collection record for the collection is deleted in block 126, and routine 120 is complete.

It should be noted that, in some embodiments, it may be desirable to incorporate rebalancing functionality in either or both of routines 100 and 120 so that, in response to the creation or destruction of a collection, the affinity of processes in other collections may be modified to either free up CPU's for a new collection or take on additional CPU's freed up by a dying collection.

Figure 9:
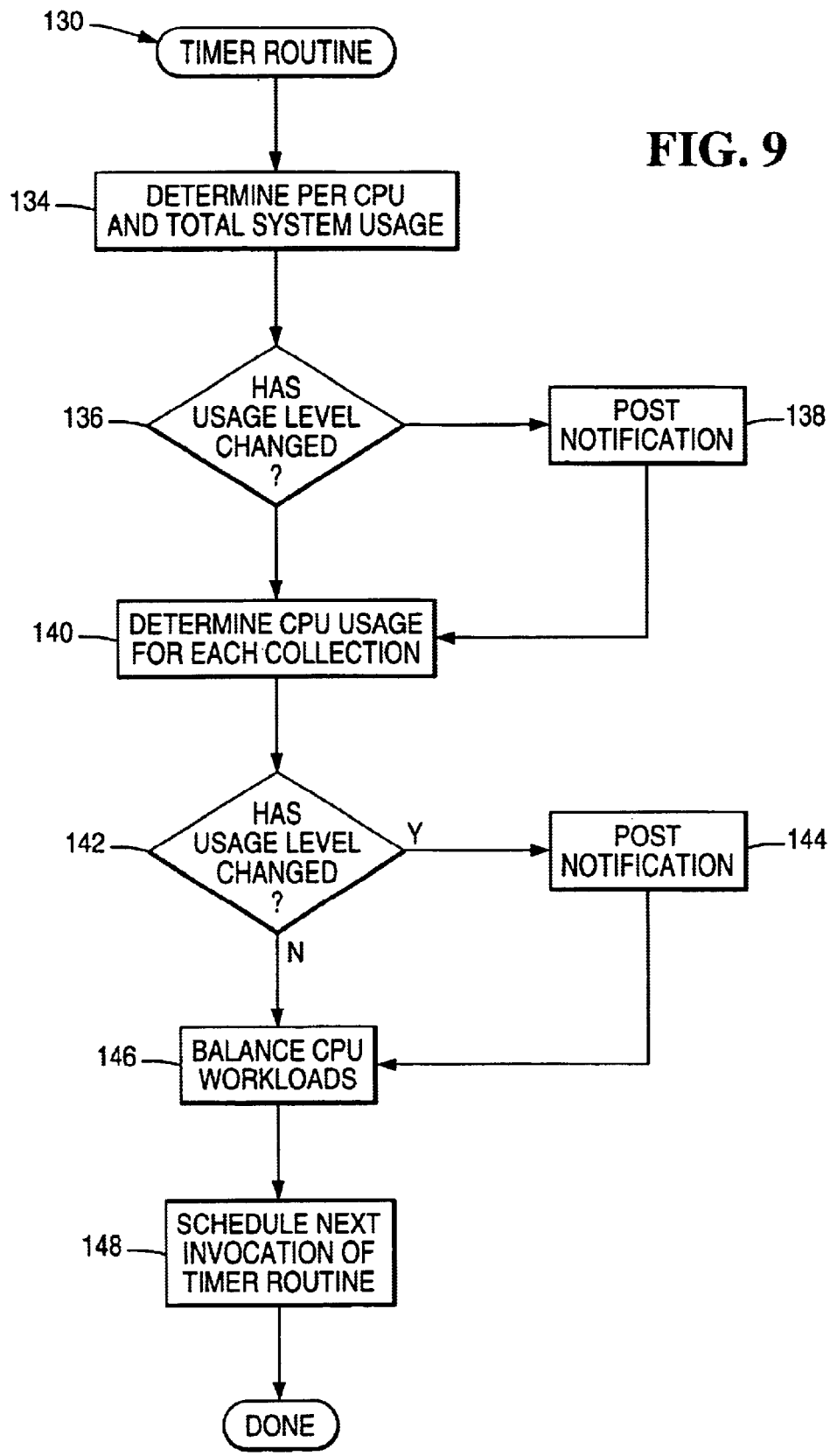
FIG. 9 is a flowchart illustrating the program flow of a timer routine executed by the driver in the computer of FIG. 2.

FIG. 9 illustrates timer routine 130, which is initiated during driver startup as discussed above in connection with block 58 of FIG. 3. Timer routine 130 may be used to simply gather usage statistics and report potential performance issues, or may be used to additionally perform dynamic rebalancing to attempt to correct any detected performance degradation issues.

Routine 130 begins in block 134 by determining per CPU and total system usage information, in any number of manners known in the art. Next, block 136 determines whether the usage level of the overall system or of any given CPU has changed an excessive amount, e.g., either above or below a desired threshold. If so, a notification is posted in block 138 to record or log the event for later statistical analysis. Control then passes to block 140 to determine the CPU usage for each collection. Also, returning to block 136, if no usage level has sufficiently changed, block 138 is bypassed, and control passes directly to block 140.

Once the CPU usage for each collection has been determined (e.g., using conventional utilization analysis, but based on collection), control passes to block 142 to determine whether any CPU usage for any collection has sufficiently changed. As above, if sufficient change is detected, control passes to block 144 to post a notification. Control then passes to block 146 to perform rebalancing of the CPU workloads. Otherwise, if no sufficient change is detected, block 142 passes control directly to block 146. Upon completion of block 146, control passes to block 148 to schedule a next invocation of the timer routine at a next predetermined time interval, and routine 130 is complete. In other embodiments, routine 130 may be maintained as a background process and automatically run at predetermined intervals, whereby scheduling of a next invocation in block 148 would not be required.

The rebalancing of system CPU resources in block 146 may be implemented in a number of manners. For example, the number of CPU's allocated to various collections may be adjusted among minimum and maximum CPU limits based on relative usages between collections, particularly within a user collection within which multiple user sessions are defined.

Figure 10:
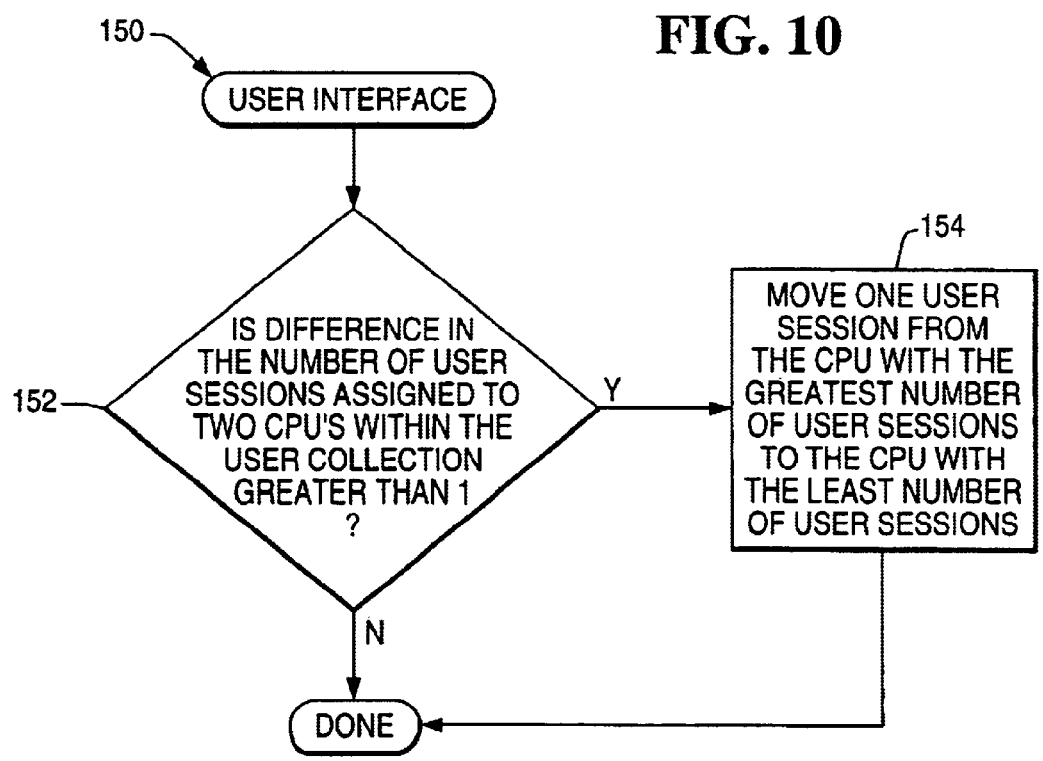
FIG. 10 is a flowchart illustrating the program flow of a user collection load balancing routine executed by the driver in the computer of FIG. 2.

A routine 150 for balancing user processes and sessions among CPUs assigned to the user collection is illustrated in FIG. 10. Initially the user collection may be allocated a variable number of CPU's, with the number of CPU's allocated to the user collection varied over time responsive to the needs of other collections, e.g., server collections, in the computer. Thus, if no server collections exist, or if any such collections do not require substantial resources, the number of CPU's allocated to the user collection may be increased to allocate more CPU resources to user sessions. Then, should any server collections require additional resources, the number of CPU's allocated to the user collection may be decreased to accommodate those additional needs.

Moreover, within the user collection, the allocation of CPU's to processes within the collection may be controlled, e.g., to allocate dedicated CPU's to different user sessions. Upon initiation of a user session, for example, all of the processes associated with that session may be assigned to a single CPU in the set of CPU's assigned to the collection. In addition, during runtime, usage patterns may be monitored, and should any imbalances be detected, user sessions may be moved from heavier-utilized CPU's to lesser-utilized CPU's, thereby harmonizing the level of activity across all of the CPU's in the collection. As a result, it should be appreciated that, while all of the processes within a particular collection may be assigned to a common set of CPU's, load balancing may nonetheless still be performed within the collection itself such that different processes within the collection utilize different CPU resources within the common set of CPU's.

User collection load balancing routine 150 begins in block 152 by determining the number of user sessions assigned to each of the CPUs allocated to the user collection. Should the difference in the number of sessions assigned to any two CPUs allocated to the user session be greater than one (or some other selected threshold value), block 152 passes control to block 154. The routine continues in block 154 by moving the processes associated with one user session from the CPU having the most user sessions assigned thereto to the CPU allocated to the user collection having the least number of user sessions assigned thereto. Routine 150 is then complete. Routine 150 may be modified such that block 172 is repeatedly executed to accomplish load balancing.

Routine 150 may be called following the reallocation of CPUs to the user collection, following the creation of new user sessions or deletion of expired sessions, or at specified intervals.

In other embodiments, the comparative usages of different collections may be analyzed and used to dynamically modify either the set of CPU's assigned to a collection or even the organization of processes within collections. Implementation of such dynamic rebalancing functionality would be within the ability of one of ordinary skill in the art having the benefit of the instant disclosure, and is as such not discussed in further detail herein.

Various modifications may be made to timer routine 130 consistent with the invention. For example, different utilization metrics may be collected and tracked, as may different thresholds be used to trigger notifications and/or rebalancing. In addition, rebalancing may be limited to situations only where sufficient utilization changes have been detected. Further, notifications may be made directly to a user or system administrator. Also, rebalancing may be performed without tracking utilization metrics. As was also discussed above, automated rebalancing may also be omitted in some implementations.

Figure 11:
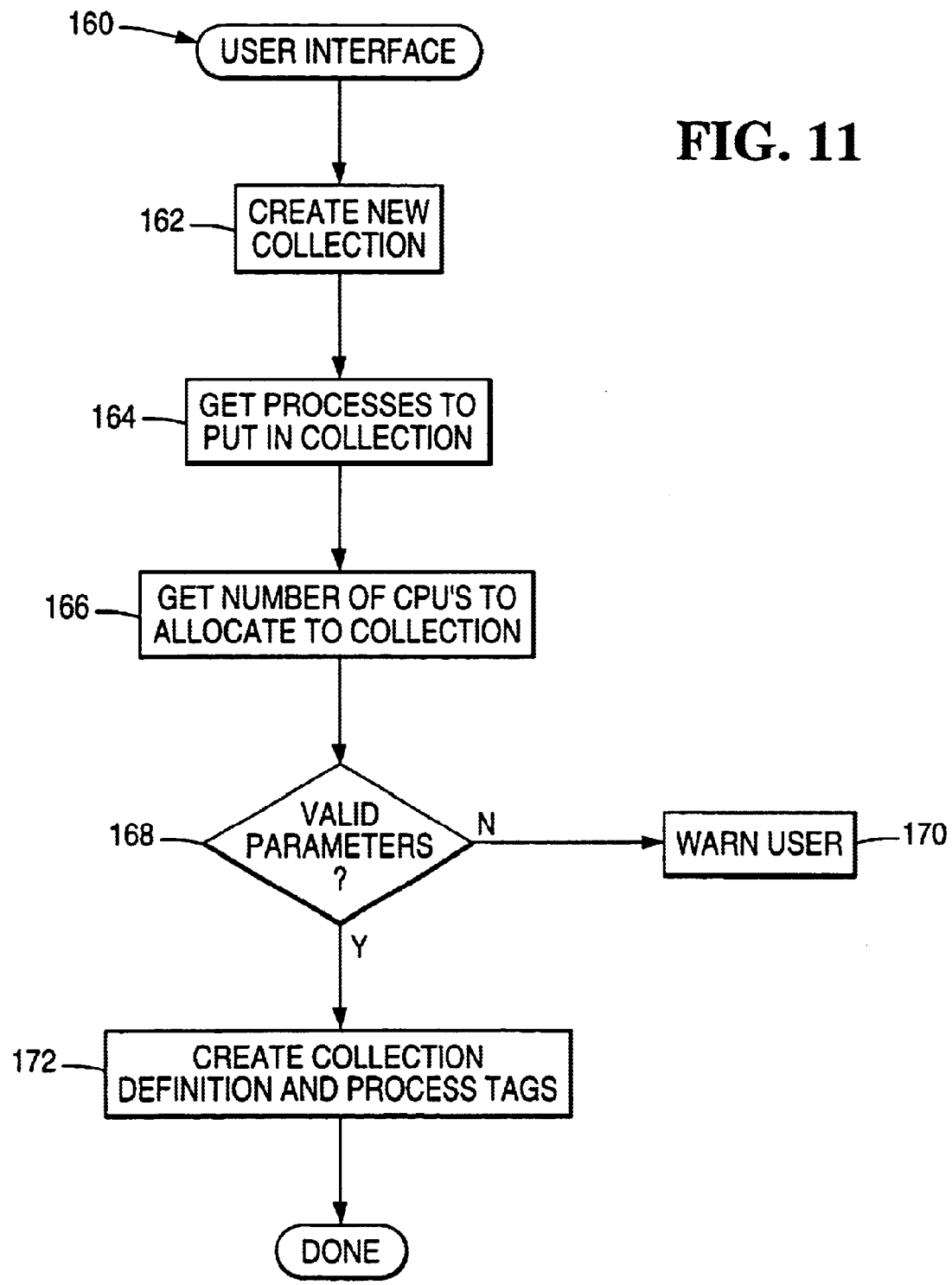
FIG. 11 is a flowchart illustrating the program flow of a user interface routine executed by the computer of FIG. 2.

As discussed above, collection definitions and process tags may be predefined by the driver. For other processes and collections for which predefined definitions and tags are not provided, it is typically desirable to provide a mechanism for a user or system operator to manually establish collections and tailor a computer to maximize system performance across multiple CPU's. FIG. 11, for example, illustrates a user interface routine 160 that may be executed to create a new collection from existing processes executing a computer 211. In the illustrated embodiment, routine 160 may be executed by a higher level user interface process linked to driver 24, rather than being implemented directly within driver 24, as is well known in the art. However, it will be appreciated that any number of alternate software organizations may be utilized to interact with a user to obtain information for use in creating a collection consistent with the invention.

Routine 160 begins in block 162 by retrieving collection information from the user, including, for example, a collection identifier, desired attributes, usage information, etc. Next, block 164 receives process identifiers of processes to be added to the new collection. Next, block 166 retrieves a desired number of CPU's to allocate to the collection, assuming that the collection definition will store only such desired number. For other embodiments, e.g., where a range of CPU's are specified and/or where selected CPU's may or may not be approved for handling a particular collection, additional information may also be obtained in block 166.

Next, block 168 performs routine error-checking to verify whether the input parameters are valid and compatible with one another. If no errors are detected, control passes to block 172 to create a collection definition based upon the input information. In addition, a process tag is created for each process to be added to the collection. Upon creation of such items, routine 160 is complete.

Returning to block 168, if any errors are detected, control passes to block 170 to warn the user. For example, if a collection specifies more CPU's than are currently available, it may be desirable to detect such an occurrence and warn the user that a resource conflict may occur based upon the current collection information. In the illustrated embodiment, however, detection of any potential errors does not require a user to modify the input information, so control passes from block 160 to block 162 to create the collection definition and process tags. In other embodiments, however, a user may be required to modify his or her input to comply with any rules established for creating a collection.

A wide variety of user input mechanisms may also be used to retrieve relevant information from a user. In the illustrated embodiment, such input is retrieved through a graphical user interface (GUI), the general use and configuration of which is well known in the art. It will be appreciated however that other interface mechanisms, e.g., text-based interface mechanisms, may be used in the alternative.

In a GUI environment, for example, receipt of user input may be made via a dialog box or window within which is displayed GUI controls to permit a user to input a collection identifier, set attributes, set usage thresholds, select CPU's, and select available processes to be added to the collection. As such, blocks 162–166 may in some embodiments be performed concurrently via input through the same window or dialog box, with error checking and creation of the collection definition and process tags being performed responsive to selection of a "create" or "ok" button displayed in connection with the input controls.

Selection of processes typically incorporates retrieving identifiers for all active processes, coupled with display of such processes to a user in such a manner that the user can indicate which active processes are to be added to the new collection. As an example, a list box GUI control may be used to display active processes, with a user having the ability to individually select or unselect displayed processes so that only selected processes are added to the collection. Other suitable input mechanisms, however, will be apparent to one of ordinary skill in the art having the benefit of the instant disclosure.

It should also be appreciated that additional functionality is typically desirable for editing existing collection definitions, e.g., to change collection information and/or change the allocation of processes to collections, as well as for deleting existing collection definitions. When modifying process allocation, for example, the same type of list box GUI control discussed above may be used to modify the process allocation responsive to user input.

Although the presently preferred embodiment of the invention has been described, it will be understood that various changes may be made within the scope of the appended claims.

What is claimed is:

1. A method of allocating processes among a plurality of processors in a multi-processor computer, said processes comprising user processes, each instance of a user process being dedicated to a single user, and server processes that typically run as a single instance to support all users, the method comprising the steps of:

(a) organizing said user processes into a user collection;

(b) organizing said server processes into at least one server collection;

(c) for each user and server collection, assigning all of the processes in such collection to a set of processors from the plurality of processors;

(d) within said user collection, organizing said user processes into at least one user session wherein each user session is associated with a particular user, and assigning all of the user processes within such session to a subset of processors from the set of processors assigned to said user collection;

(e) in response to a request to create a new user process, determining whether the new user process should be organized into an existing session within said user collection, and if not, dynamically creating a new user session, organizing the new user process in the new user session, and assigning the new user session to a subset of processors from the set of processors assigned to said user collection; and (f) in response to a request to create a new server process, determining whether the new server process should be organized into an existing server collection, and if not, dynamically creating a new server collection, organizing the new server process in the new server collection, and assigning the new server collection to a set of processors from the plurality of processors.

2. The method of claim 1, further comprising the steps of:

in response to determining that a new user process should be organized into an existing user session, organizing the new user process into such existing user session such that the new user process is assigned to the subset of processors for the such existing user session, in response to determining that a new server process should be organized into an existing server collection, organizing the new server process into such existing server collection such that the new server process is assigned to the set of processors for the such existing server collection.

3. The method of claim 1, further comprising the steps of:

in response to a request to delete an existing user process, removing the existing user process from an existing session within which the existing user process is organized, determining whether any other user processes are organized in the existing user session, and, if not, deleting the existing user session;

in response to a request to delete an existing server process, removing the existing server process from an existing server collection within which the existing server process is organized, determining whether any other server processes are organized in the existing server collection, and, if not, deleting the existing server collection.

4. The method of claim 3, further comprising the step of:

upon deletion of an existing server collection, reassigning processors included in said set of processors assigned to said deleted server collection to said user collection.

5. The method of claim 4, further comprising the step of:

periodically reassigning user sessions to subsets of processes within said set of processes assigned to said user collection to balance the user process workload among the set of processes assigned to said user collection.

6. A computer system for processing a plurality of processes comprising user processes, each instance of a user process being dedicated to a single user, and server processes that typically run as a single instance to support all users, said computer system comprising:

a plurality of processors; and a program configured to:

(1) organize said user processes into a user collection;

(2) organize said server processes into at least one server collection;

(3) for each user and server collection, assign all of the processes in such collection to a set of processors from the plurality of processors;

(4) within said user collection, organize said user processes into at least one user session wherein each user session is associated with a particular user, and assign all of the user processes within such session to a subset of processors from the set of processors assigned to said user collection;

(5) in response to a request to create a new user process, determine whether the new server process should be organized into an existing session within said user collection, and if not, dynamically create a new user session, organize the new user process in the new user session, and assign the new user session to a subset of processors from the set of processors assigned to said user collection; and (6) in response to a request to create a new server process, determine whether the new server process should be organized into an existing server collection, and if not, dynamically create a new server collection, organize the new server process in the new server collection, and assign the new server collection to a set of processors from the plurality of processors.

7. The apparatus of claim 6, wherein the program is further configured to:

in response to determining that a new user process should be organized into an existing user session, organize the new user process into such existing user session such that the new user process is assigned to the subset of processors for the such existing user session, in response to determining that a new server process should be organized into an existing server collection, organize the new server process into such existing server collection such that the new server process is assigned to the set of processors for the such existing server collection.

8. The computer system of claim 6, wherein the program is further configured to:

in response to a request to delete an existing user process, remove the existing user process from an existing session within which the existing user process is organized, determine whether any other user processes are organized in the existing user session, and, if not, delete the existing user session;

in response to a request to delete an existing server process, remove the existing server process from an existing server collection within which the existing server process is organized, determine whether any other server processes are organized in the existing server collection, and, if not, delete the existing server collection.

9. The computer system of claim 8, wherein the program is further configured to:

upon deletion of an existing server collection, reassign processors included in said set of processors assigned to said deleted server collection to said user collection.

10. The computer system of claim 8, wherein the program is further configured to:

periodically reassign user sessions to subsets of processes within said set of processes assigned to said user collection to balance the user process workload among the set of processes assigned to said user collection.

11. A computer-readable medium comprising a program for use in allocating processes among a plurality of processors in a multiprocessor computer, said processes comprising user processes, each instance of a user process being dedicated to a single user, and server processes that typically run as a single instance to support all users, said program configured to:

(a) organize said user processes into a user collection;

(b) organize said server processes into at least one server collection;

(c) for each user and server collection, assign all of the processes in such collection to a set of processors from the plurality of processors;

(d) within said user collection, organize said user processes into at least one user session wherein each user session is associated with a particular user, and assign all of the user processes within such session to a subset of processors from the set of processors assigned to said user collection;

(e) in response to a request to create a new user process, determine whether the new server process should be organized into an existing session within said user collection, and if not, dynamically create a new user session, organize the new user process in the new user session, and assign the new user session to a subset of processors from the set of processors assigned to said user collection; and (f) in response to a request to create a new server process, determine whether the new server process should be organized into an existing server collection, and if not, dynamically create a new server collection, organize the new server process in the new server collection, and assign the new server collection to a set of processors from the plurality of processors.

* * * * *